Sept. 27, 1966            E. COLTON            3,275,414
METHOD OF PREPARING HEXABORON SILICIDE($B_6Si$)
Filed Dec. 30, 1959
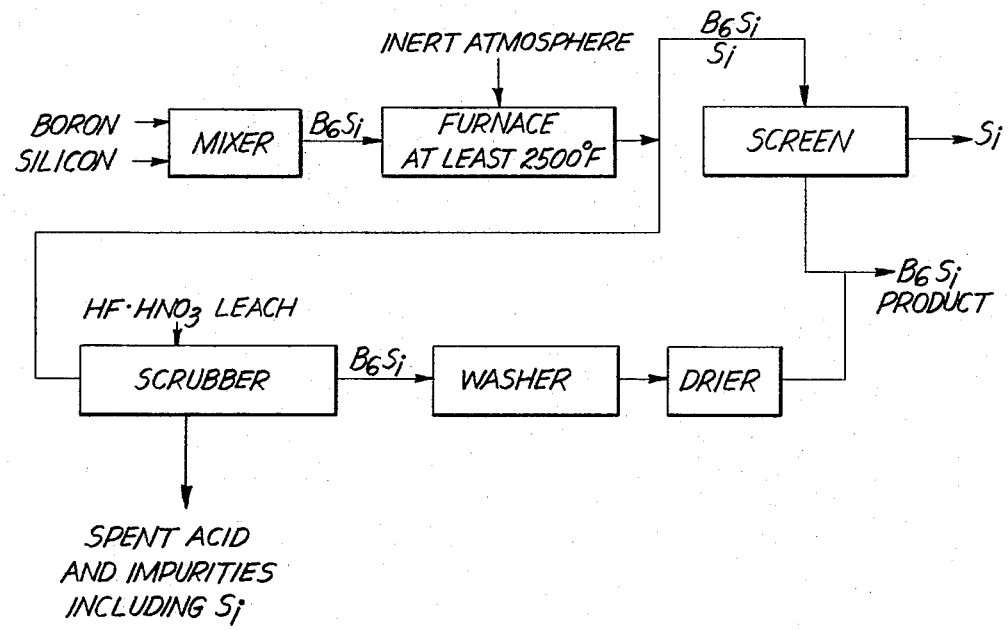
Inventor
Erwin Colton
By Richard R Mybeck
Attorney

United States Patent Office 3,275,414
Patented Sept. 27, 1966

3,275,414
METHOD OF PREPARING HEXABORON
SILICIDE ($B_6Si$)
Ervin Colton, Milwaukee, Wis., assignor to Allis-Chalmers
Manufacturing Company, Milwaukee, Wis.
Filed Dec. 30, 1959, Ser. No. 862,933
8 Claims. (Cl. 23—204)

This invention relates generally to a method of preparing a highly refractive silicide and more particularly to an improved method of synthesizing hexaboron silicide ($B_6Si$).

It has long been known that the elements boron and silicon unite to form a compound which Henry Moissan in his book on electric furnace (1900) identifies as a boron silicide having the formula $B_3Si$. Also in 1900, H. Moissan and A. Stock, in an article appearing in volume 131 of Compt. rend., at pages 139–143, reported their isolation and identification of a boron silicide having the formula $B_6Si$. Both the $B_3Si$ and the $B_6Si$ were obtained by passing an electric current through a mixture containing one part of silicon and five parts of boron. The reaction product was treated with a hot caustic solution to obtain $B_6Si$.

Recent workers, namely, L. Brewer et al., in volume 34 of the Journal of the American Ceramic Society at page 173 (1951) and J. A. Stravrolakis et al., in volume 35 of the American Ceramic Society Bulletin at pages 47 (1956), report that boron and silicon do not react with each other at temperatures below 3137° F.

On the other hand, C. W. Balke in U.S. 2,073,826 (March 16, 1937) and C. F. Cline in volume 106 of the Journal of the Electrochemical Society at page 322 (1959) indicate that boron may be reacted with numerous metals including silicon, providing fusion conditions are maintained to form so-called "metal borides."

During recent years the need for relatively inexpensive refractory high temperature and oxidation resistant materials has provoked much investigatory work. The present invention is the result of such work in the boron-silicon system and is predicated upon my discovery that boron and silicon can be reacted when heated to a temperature in the range of from at least 2500° F. but beneath the fusion temperature of the reacting mixture, to form a hexaboron silicide product which is particulate and readily compactible or otherwise formable into bodies of diverse shapes and sizes for the aforementioned high temperature use in oxidizing and other atmospheres. Thus, as will hereinafter become apparent, I have discovered, inter alia, that a commercial $B_6Si$ product can be formed in a temperature range where the prior experts taught it couldn't be done.

Accordingly, one of the prime objects of the present invention is to fulfill the existing need for an advance in the art of manufacturing compounds of such a chemical composition and such physical structure that they will be highly useful for applications where oxidation resistance is required and highly refractory properties are desired such, for example, as in refractory lined equipment or in high temperature gas turbine parts.

It is a further object of the present invention to provide a method of preparing hexaboron silicide which is superior to the methods heretofore known and which is capable of producing $B_6Si$ at commercially practicable temperatures and in large quantities which, as produced, is sufficiently free from contaminating ingredients that the compound is highly useful in many ways.

Another object of the present invention is to provide a method for producing hexaboron silicide operable without fusion and below the melting temperatures of either boron or silicon and at a readily obtainable temperature of at least 2500° F.

It is still a further object of the present invention to provide a relatively low temperature method of forming hexaboron silicide which avoids product fusion and the disadvantages attendant therewith and which is simple, inexpensive, rapid and readily controlled.

These and still further objects as shall hereinafter appear are fulfilled by the present invention in a manner easily discerned from the following detailed description, particularly when considered in conjunction with the accompanying drawing which illustrates a schematic flow sheet of a method of preparing $B_6Si$ in accordance with the present invention.

As shown in the accompanying drawing, elemental silicon and elemental boron are reacted together in a furnace provided with an inert atmosphere which is heated to a temperature of at least 2500° F. to form $B_6Si$.

Two alternative schemes are illustrated for "purifying" the final product, that is, to remove unreacted silicon therefrom. One is mechanical and employs a screen. The other is chemical and employs a leach system. Both will be more fully described in latter portions of this description.

The raw materials used in the process of the present invention are the elements themselves, i.e., boron and silicon. Both preferably are employed in a finely divided, powdered form. The reaction is carried out in inert atmosphere in order to avoid the formation of a boron-silicon-oxygen phase or boron and silicon nitrides which form whenever boron and silicon are heated in air.

Silicon of a crystalline variety and having a size distribution about minus 48 mesh and finer having a purity of at least 98 percent is readily available commercially and has been found extremely satisfactory in the practice of this invention. Other types of silicon, such as the amorphous variety, can be used, however, with equally good results being obtained.

In a preferred practice of the invention, a large particle sized silicon material, such as minus 48 mesh-plus 200 mesh, is used because, as will be hereinafter discussed, the slight excess of silicon which is desired, can readily be separated from the reaction product by the simple expedient of screening.

Boron of the amorphous type, about 85 percent of which readily passes through a 325 mesh screen is found especially suited to this invention. This type of boron is readily available commercially and in purity grades of 85 percent to 99 percent. Crystalline boron may be used in this process if desired but it is a scarce and expensive commercial commodity and reacts at a much slower rate than does the amorphous variety.

Heating is preferably carried out in any type of furnace in which a blanket of inert gas, such as argon or helium, can be maintained around the reactants throughout the time they are in the furnace. For convenience, an electrically operated resistance furnace is used although a gas fired type could be employed equally as well. In the latter case, a gas tight muffle must be used so that the gaseous combustion products do not contaminate the reacting materials or their reaction products.

Under ideal conditions in which a completely gas tight reaction chamber is obtained, it is possible to react boron and silicon together in the exact stoichiometric ratio required for formation of $B_6Si$, i.e., a boron-to-silicon ratio of 6:1. This is illustrated in Table I below in which 95 percent boron and 98 percent silicon were heated in an impervious 1¼ inches diameter ceramic tube.

TABLE I.—SYNTHESIS OF HEXABORON SILICIDE
(2600–2700° F., HELIUM ATMOSPHERE)

| Molar Ratio, Boron:Silicon | X-Ray Analysis of Furnace Product | |
|---|---|---|
| | Si | $B_6Si$ |
| 1:1 | vs | vw |
| 2:1 | s | w |
| 3:1 | m | m |
| 4:1 | w | s |
| 5:1 | vvw | vs |
| 6:1 | none | vs |

Generally, in commercial production on a large scale, it is not possible to maintain an absolutely gas tight reaction chamber. Under these circumstances, some small amount of nitrogen from the air may diffuse into the reaction chamber. In the presence of high boron concentrations, nitrogen unites with boron to form boron nitride, an undesirable impurity, as is shown in Table II below. Thus, where 86.6 percent boron and 98 percent silicon are heated in an electric furnace having an operating chamber of about 2 cubic feet flooded with argon, the following data is obtained:

TABLE II.—SYNTHESIS OF HEXABORON SILICIDE
(2600° F., ARGON ATMOSPHERE)

| Molar Ratio, Boron:Silicon | X-Ray Analysis of Furnace Product | | |
|---|---|---|---|
| | Si | $B_6Si$ | BN |
| 1:1 | vs | vw | |
| 2:1 | ms | w | |
| 3:1 | m | m | |
| 4:1 | vvw | vs | |
| 5:1 | vvw | mw | mw |
| 6:1 | | w | s | where the following X-ray designations are used: vs—very strong, ms—medium strong, s—strong, m—medium, mw—medium weak, w—weak and vvw—very, very weak, i.e., almost undetectable.

For the purpose of a large scale synthesis of $B_6Si$ in accordance with this invention, it is desirable to have present an excess of silicon in order to insure the complete reaction of boron. This excess of silicon is further desirable over an excess of more costly boron because silicon is much easier to remove mechanically and/or chemically from the furnace product resulting after boron and silicon are heated. Any combination of silicon and boron which will react completely at the temperatures specified herein can be used.

Based on the data in Table II and from practical experience encountered in numerous syntheses of $B_6Si$, a reaction mixture of 1.54 parts of boron to 1.00 part of silicon (on a 100 percent pure weight basis) or an atomic ratio of boron-to-silicon of 4:1 has proven to be satisfactory to insure complete reaction of the boron and minimum introduction of boron nitride impurity. This, of course, does not mean to imply that other silicon to boron ratios, weight ratios, cannot be used under slightly varied conditions to obtain good $B_6Si$ product but, rather, that such modifications will be obvious to those skilled in the art after they have considered this disclosure.

Another practice of the present invention comprises forming a mixture of elemental boron and elemental silicon having a slight molar surplus of silicon. This mixture is characterized by a brownish to a brownish-black hue.

It is found that silicon powder of 98 percent purity and of a size about minus 100 mesh may be used in the practice of this invention with desirable results. It should be noted, however, that particle size is not critical to the invention except as previously noted, coarser silicon particles will enable the end product to be separated from unreacted silicon by mechanical means such as a vibrating screen. On the other hand, fine material will react at a faster rate than coarser material due to greatly increased surface exposed for reaction; if the speed of reaction is therefore a prime consideration, the finer particles can be used with the final product separation being effected by a chemical means as is hereinafter described.

Amorphous boron powders of both 95–97 percent and of 85–88 percent purity have been used in the practice of this invention with equally satisfactory results. It was found, however, that when the less pure material is used, more should be used in order to fulfill the molar requirements for each element present. The particle size of the amorphous boron used was about minus 200 mesh.

The elemental boron and silicon mixture is provided with a boron-to-silicon ratio of about 6 to 1 but not more than 6 to 1. The mixture may be reacted by placing it into containers which do not react with boron or silicon and which are capable of withstanding the temperatures hereinafter discussed. Containers of ordinary fire clay are quite satisfactory.

The mixture in the resistant container is then fed into a suitable furnace such, for example, as an electric resistance furnace, where it is heated to a temperature of at least 2500° F., but not sufficient to cause the mixture to fuse. The heating may be effected either by prefiring or concurrent firing of the furnace. It is probably generally preferable to prefire the furnace to enable the more expeditious processing of the materials although it is not imperative that it be so done. Thus, an equally desirable product is obtained when the mixture is charged into a cool furnace which is subsequently fired. It is important that while the temperature of the charge must reach at least 2500° F., it cannot be permitted to reach the fusion temperature of the mixture because at the fusion temperature, the unreacted silicon will completely fuse with the hexaboron silicide. The subsequent separation of unreacted silicon from product hexaboron silicide when the silicon and $B_6Si$ have fused, is an involved, expensive and commercially impracticable procedure.

In practicing the present invention to produce substantially pure hexaboron silicide, the furnace is sealed and maintained with an inert atmosphere. This inert atmosphere may be provided by conventional feed and withdrawal means (not shown).

If, on the other hand, it is not desired to prepare a pure product, that is, where the application permits traces of boron nitride and boron-silicon oxides to be tolerated, air may be used as the furnace atmosphere. This variant provides a commercially satisfactory product which, while containing some foreign matter, possesses enough of the attributes of the pure hexaboron silicide to satisfy the refractive requirements of less stringent specifications.

The boron-silicon charge is maintained in the furnace for a period of time, ranging from a few minutes to about eight hours, which is sufficient to substantially completely react all of the boron with silicon. The duration of the heating step for a given mixture is, of course, dependent upon a number of variables including the amount of the material charged, the size of the particles in the charge and the actual temperature at which the furnace is operated but can be readily ascertained by one skilled in the art and having the benefit of this disclosure.

When the reaction product has been formed, that is, the boron-silicon reaction is substantially complete chemically, the product is cooled.

The two alternate procedures for separating the excess and unreacted silicon from the product hexaboron silicide will now be discussed.

When fine particle-sized silicon and boron are used as the initial reactants, the furnace product is transferred to a suitable cleaning device such as a scrubber. In the scrubber the product encounters a suitable leach solution such, for example, as a nitric-hydrofluoric acid solution, which, by slightly agitated engagement with the product, extracts the unreacted silicon therefrom. The spent leach liquor, which now contains substantially all of the excess silicon from the furnace product, is drained from the scrubber. The leached $B_6Si$ is then passed through a washer where water or other suitable solvent is employed to remove any remaining leach solution from the $B_6Si$ particles. After washing, the $B_6Si$ is dried in a suitable drier which dispels any residual water therefrom. The product is then ready for use.

Alternatively, when relatively large particles of silicon are employed in the initial charge, the unreacted silicon can be removed from the product $B_6Si$ by a simple screening process. Because no fusion occurs in the synthesis of this invention, there is no appreciable particle size change of the unreacted silicon. Therefore, the relatively large silicon particles, such as minus 48 mesh-plus 200 mesh size range, are readily separated from $B_6Si$ by feeding the furnace product through a fine screen such, for example, as a 200 mesh size. Only the $B_6Si$ passes through. Unreacted, excess silicon, being larger than the 200 mesh opening, stays on the deck and is discharged in the conventional manner.

The color changes of the original reactants as the product is formed provide a practical basis for determining the completeness of the reaction. Thus, the product, when the reaction is complete, has a gray to black coloring depending on the amount of unreacted silicon present. Silicon gives the product a gray hue while the substantially pure hexaboron silicide is black. If the product still has the brownish cast which characterized the initial charge, the reaction is incomplete and the product should be fired further. The brownish color is caused by the presence of unreacted boron.

Pure hexaboron silicide is black. Samples containing traces of unreacted and unremoved silicon are gray-to-black as are samples containing traces of boron nitride and oxides of boron and/or silicon.

X-ray powder diffraction patterns are used to identify $B_6Si$ in the synthesis product. In addition, chemical analysis serves to further establish the existence and purity of the prepared $B_6Si$. Hexaboron silicide has a theoretical boron-to-silicon ratio of 6.0 to 1. Typical preparations as described herein showed a boron-to-silicon ratio of 5.9 and 6.0 to 1.

For a better understanding of this invention, reference is made to the following examples which are meant only to be illustrative of the process described herein and not limiting in scope.

*Example 1*

A fire clay crucible was filled with a mixture of 500 grams of 85.8 percent boron (39.6 moles) and 570 grams of plus 200 mesh 98 percent silicon (19.8 moles). The reactants were put into an electric furnace, the muffle of which was then flushed with dry argon of 99.9 percent purity for 30 minutes. Heating was started, five hours being required to reach 2600° F., which temperature was then maintained for 2–3 hours. The power was shut off, allowing the furnace and contents to cool down over 16–18 hours under the argon atmosphere. The slaglike top of the cool crucible was easily removed mechanically and the friable, black core pulverized lightly through a 325 mesh screen. X-ray analysis of the screened portion showed $B_6Si$ with negligible traces of silicon. Chemical analysis showed boron 69.59 percent and silicon 30.42 percent. $B_6Si$ contains theoretically boron 69.80 percent and silicon 30.20 percent.

*Example 2*

A briquette composed of 2.6 parts of 99 percent silicon and 1.0 part of 95–97 percent boron (on a 100 percent pure basis) was heated by induction to 2966° F. for ten minutes in a helium atmosphere. The product was carefully treated with nitric-hydrofluoric acids in order to remove excess silicon. X-ray examination of the purified material showed only the presence of $B_6Si$. Chemical analysis of the purified product gave boron, 65.1 percent and silicon, 28.8 percent or a boron-to-silicon atomic ratio of 5.9.

*Example 3*

A mixture of 100 grams of 95–97 percent boron (8.9 moles) and 62.5 grams of 99 percent silicon (2.2 moles) in a fire clay crucible was heated to 2500° F. for 48 hours in stagnant air and furnace cooled. X-ray examination of the unpurified furnace product showed only $B_6Si$ and elemental silicon. No other boron-silicon compounds could be detected.

*Example 4*

A fire clay crucible was filled with 100 grams of 86.6 percent boron (8.0 moles) and 57 grams of −48, +200 mesh 98 percent silicon (2.0 moles) and heated for 2½ hours at 2600° F. in an argon atmosphere. The reaction product, after removal of the slaglike top, weighed 134 grams. After screening through a 200 mesh screen, 110 grams of $B_6Si$ and 24 grams of unreacted silicon plus impurities were obtained.

$B_6Si$ powder can be compressed in steel dies or slip cast by the usual ceramic techniques. It is light (specific gravity about 2.5) and very refractory and can easily withstand severe corrosion in air at temperatures of 2500° F.–3000° F. Pieces formed from compacted $B_6Si$ powder show negligible dimensional changes when heated in air at 2500° F. $B_6Si$ thus is highly useful for high temperature bodies. Powdered $B_6Si$ is abrasive and crystalline $B_6Si$ has a microhardness of about 2300–2600 Knoop.

Thus, from the foregoing it can now be fully appreciated that a method of preparing hexaboron silicide has been described which fulfills all of the aforestated objectives and which is especially significant because it enables boron and silicon to be reacted to form hexaboron silicon at temperatures of about 2600° F., that is in the range from at least 2500° F. to beneath the fusion temperature of the reacting mixture.

"Fusion temperature," as used herein, means that temperature at which the boron and silicon melt to form a liquid phase which cools to an integral mass. The exact temperature at which this occurs is readily detectable for a given boron-silicon mixture by observing its physical appearance during or after heating. Thus, if the furnace temperature is too high, the furnace charge will become viscous and produce, upon cooling, a solid shiny mass in contrast to the black crystalline dullish looking powder obtained by the practice of the present invention.

It is, of course, understood that the methods herein described are presented to exemplify the present invention rather than to limit it, and such alterations, modifications and applications as may readily occur to the skilled artisan are intended within the spirit of this invention, especially as it is defined by the claims appended hereto.

Having now particularly described and ascertained the nature of my said invention and the manner in which it is to be performed, I declare that what I claim is:

1. The method of making hexaboron silicide comprising: mixing elemental boron and silicon having a respective ratio of at least two to one, but below six to one and having a brownish hue; heating said charge in an inert atmosphere to a temperature of at least 2500° F. but below the fusion temperature of the charge; maintaining said charge at said temperature in said atmosphere until said brownish hue disappears therefrom; cooling said charge; and removing said molecular excess of silicon from said charge.

2. The method of making hexaboron silicide comprising: forming a mixture of about 5.9 molecular equivalents of boron and 1 molecular equivalent of silicon; heating said mixture in an inert atmosphere to a temperature of at least 2500° F. but below the fusion temperature of said mixture; maintaining said mixture at said temperature for a period of one to six hours until substantially all of said boron has reacted with said silicon and removing any excess silicon from said charge.

3. The method of making hexaboron silicide comprising: forming a mixture of silicon and boron having a boron-to-silicon ratio of at least two to one but not more than six to one; heating said mixture in an inert gas atmosphere to a temperature of at least 2500° F. but below the fusion temperature of the mixture; maintaining said mixture at said temperature for a period of one to six hours until substantially all of said boron has reacted with silicon to form a product consisting of hexaboron silicide and unreacted silicon; cooling said product; and separating said unreacted silicon from said hexaboron silicide in said product.

4. The method according to claim 3 in which said unreacted silicon is separated from said hexaboron silicide in said product by: leaching said product with hydrofluoric-nitric acid solution; washing said leached product with water to remove substantially all of said solution therefrom; and drying said product to dispel substantially all of said water therefrom.

5. The method of making a highly refractive silicide consisting essentially of hexaboron silicide comprising: mixing elemental silicon and elemental boron with the ratio of boron to silicon of at least two to one and below six to one to form a charge having a brownish hue; heating said charge to a temperature of at least 2500° F. but below the fusion temperature of said charge until said brownish hue disappears; cooling said charge and removing any excess silicon from said charge.

6. The method of making a highly refractive silicide consisting essentially of hexaboron silicide comprising: forming a mixture consisting of at least two but not over six molecular equivalents of boron per each one molecular equivalent of silicon; heating said charge to a temperature of at least 2500° F., said temperature being sufficient to initiate the reaction between said boron and said silicon but not to fuse it; maintaining said mixture at said temperature until substantially all of said boron has reacted with said silicon to form a product consisting essentially of hexaboron silicide and removing any excess silicon from said charge.

7. The method of making hexaboron silicide comprising: heating a mixture of boron and silicon having a boron to silicon molecular ratio of at least two to one but below six to one to a temperature of at least 2500° F. and below the fusion temperature of the mixture for a period of one to six hours to react all of said boron with said silicon to form a reaction product consisting essentially of hexaboron silicide; cooling said reaction product; and extracting any excess of silicon from said product.

8. The method of making hexaboron silicide comprising: heating silicon in intimate mixture with at least two but less than six equivalents of boron to a temperature in excess of 2500° F. but not sufficient to fuse the mixture; maintaining said mixture at said temperature until said boron completely reacts therewith to form a reaction product consisting essentially of hexaboron silicide as evidenced by the color change of the mixture from a brownish-black to a grayish-black and removing any excess silicon from said mixture.

References Cited by the Examiner

UNITED STATES PATENTS 3,138,468  6/1964  Matkovich et al. ____ 23—204 X

OTHER REFERENCES

Brewer et al.: "Journal of the American Ceramic Society," vol. 34, p. 177 (1951).

Journ. of the Electrochemical Society, January 1959, vol. 106, No. 1, pages 322–325.

Moissan et al.: "Berichte," vol. 33, Part II, pages 2125–2131, (1900).

Stavrolakis et al.: "Bulletin of the American Ceramic Society," vol. 35, pp. 47–52 (1956).

OSCAR R. VERTIZ, *Primary Examiner.*

MAURICE A. BRINDISI, *Examiner.*

M. WEISSMAN, E. STERN, *Assistant Examiners.*